(12) United States Patent
Owada et al.

(10) Patent No.: US 10,294,990 B2
(45) Date of Patent: May 21, 2019

(54) LINEAR MOTION GUIDE DEVICE

(71) Applicant: NTN CORPORATION, Osaka (JP)

(72) Inventors: Tomoyuki Owada, Shizuoka (JP); Masaki Kagami, Shizuoka (JP)

(73) Assignee: NTN CORPORATION, Osaka (JP)

(*) Notice: Subject to any disclaimer, the term of this patent is extended or adjusted under 35 U.S.C. 154(b) by 81 days.

(21) Appl. No.: 15/686,910

(22) Filed: Aug. 25, 2017

(65) Prior Publication Data

US 2017/0350447 A1 Dec. 7, 2017

Related U.S. Application Data

(62) Division of application No. 14/436,162, filed as application No. PCT/JP2013/078027 on Oct. 16, 2013.

(30) Foreign Application Priority Data

Oct. 17, 2012 (JP) ................. 2012-229462

(51) Int. Cl.
*F16H 3/06* (2006.01)
*F16H 27/02* (2006.01)
(Continued)

(52) U.S. Cl.
CPC ............ *F16C 29/04* (2013.01); *F16C 29/045* (2013.01); *F16C 29/0692* (2013.01);
(Continued)

(58) Field of Classification Search
CPC ............ F16H 2025/204; F16H 57/027; F16C 29/0692; F16C 29/005; F16C 29/045; F16C 29/12
See application file for complete search history.

(56) References Cited

U.S. PATENT DOCUMENTS 4,392,390 A 7/1983 Johnson
4,396,235 A * 8/1983 Teramachi ............ F16C 29/004
384/44

(Continued)

FOREIGN PATENT DOCUMENTS

CN 102080687 6/2011
EP 1 043 510 10/2000
(Continued)

OTHER PUBLICATIONS

Office Action dated Oct. 4, 2017 in U.S. Appl. No. 14/436,162.
(Continued)

*Primary Examiner* — Jake Cook
(74) *Attorney, Agent, or Firm* — Wenderoth, Lind & Ponack, L.L.P.

(57) ABSTRACT

A linear motion guide device has a high rigidity, a good linear motion guiding accuracy, and as little rattling as possible. The linear motion guide device prevents sand, water or other contaminants from entering its actuator main body, and features low maintenance requirement. A linear motion member of the linear motion guide device includes is constituted by a plurality of axially divided segments. Each of these segments supports a plurality of guided members which make contact with two, mutually paired, guide surfaces of a housing. A preload can be applied between the guide surfaces and the guided member. The housing has a sealed structure, with a pressure inside the housing higher than an external pressure, for preventing external sand and water from entering the housing.

7 Claims, 10 Drawing Sheets

(51) Int. Cl.
*F16H 29/02* (2006.01)
*F16H 29/20* (2006.01)
*F16C 29/04* (2006.01)
*F16C 29/08* (2006.01)
*F16C 29/06* (2006.01)
*F16H 25/20* (2006.01)
*F16H 57/027* (2012.01)

(52) U.S. Cl.
CPC ............ *F16C 29/08* (2013.01); *F16H 57/027* (2013.01); *F16H 2025/204* (2013.01); *F16H 2025/2075* (2013.01)

(56) References Cited

U.S. PATENT DOCUMENTS

| | | | |
|---|---|---|---|
| 4,428,710 | A | 1/1984 | Grisebach et al. |
| 5,086,705 | A * | 2/1992 | Jarvis .................... B23Q 1/262 |
| | | | 105/141 |
| 2001/0015581 | A1 | 8/2001 | Sato et al. |
| 2005/0109139 | A1 | 5/2005 | Nagai et al. |
| 2007/0199556 | A1 | 8/2007 | Murai et al. |
| 2009/0080816 | A1 | 3/2009 | Schroeder |
| 2010/0206102 | A1 | 8/2010 | Aso et al. |

FOREIGN PATENT DOCUMENTS

| | | |
|---|---|---|
| EP | 2 042 759 | 4/2009 |
| JP | 2-186157 | 7/1990 |
| JP | 5-52218 | 3/1993 |
| JP | 6-264923 | 9/1994 |
| JP | 11-62955 | 3/1999 |
| JP | 2001-221229 | 8/2001 |
| JP | 2005-42887 | 2/2005 |
| JP | 2005-172234 | 6/2005 |
| JP | 2007-216280 | 8/2007 |
| JP | 2007-333046 | 12/2007 |
| JP | 2010-179323 | 8/2010 |
| WO | 2009/034804 | 3/2009 |
| WO | 2012/144371 | 10/2012 |

OTHER PUBLICATIONS

International Search Report (ISR) dated Dec. 3, 2013 in International (PCT) Application No. PCT/JP2013/078027.
Notification Concerning Transmittal of International Preliminary Report on Patentability (IPROP) Form PCT/IB/326 dated Apr. 30, 2015 in International (PCT) Application No. PCT/JP2013/078027, together with IPROP.
Notification of Transmittal of Translation of the International Preliminary Report on Patentability (IPROP) Form PCT/IB/338 dated Apr. 30, 2015 in International (PCT) Application No. PCT/JP2013/078027, together with English translations of the IPROP and the Written Opinion.
Office Action dated Jun. 27, 2016 in corresponding Chinese Application No. 201380054510.0, with English translation.
Notification of Reason(s) for Refusal dated May 24, 2016 in corresponding Japanese Application No. 2012-229462, with English translation.
Extended European Search Report dated Feb. 17, 2017 in corresponding European Application No. 13847239.4.

* cited by examiner

LINEAR MOTION GUIDE DEVICE

TECHNICAL FIELD

The present invention relates to linear motion guide devices used in linear motion guides for machine tools, measuring apparatuses, transport apparatuses, etc., and more specifically to a linear motion guide device which is suitable to guiding a linear motion member of a solar orbital tracking mechanism in a solar photovoltaic/thermal power generation apparatuses.

BACKGROUND ART

A linear motion guide used in a positioning section of, e.g., a machine tool, may include a component as shown in FIG. 16 A and FIG. 16 B, which is called linear rail guide (also called linear motion rolling bearing). The component is an assembly of a linear rail 30 and a sliding unit 31 which slides along the linear rail 30. The linear rail guide has a large variety in its size and shape, etc., and a wide range of the product is available from a number of manufacturers according to specific application requirements such as expected load, mounting attitude, etc.

Linear rail guides which are currently used widely can be divided into two types: One is called circulation type, in which rolling elements (not illustrated) such as balls and rollers in the linear rail guide circulate inside the sliding unit 31. The other type is called finite stroke type, in which rolling elements called cross roller guides stay captured by a retainer. For increased durability, both types make use of hardened steel such as a bearing steel for their linear rail 30 which provides a guide surface and for the rolling elements. As understood from the example in FIG. 16 A, FIG. 16 B, a ball screw mechanism and a linear rail guide are combined in parallel with each other, so that the ball screw mechanism will not come under a direct radial or moment load. This arrangement provides highly durable and accurate linear motion guides.

There are linear motion guides which do not make use of the linear guide rail: Patent Literatures 1 through 4 disclose techniques for implementing such linear motion guides by using vertical grooves and vertical guide surfaces formed on, e.g., an inner surface of a housing, etc., and a cam follower or other bearings which move along these vertical grooves and vertical guide surfaces. Also, Patent Literature 5 discloses a technique of implementing a linear motion guide by arranging a plurality of bearings in a circumferential direction of a housing, so that outer ring surfaces of these bearings make contact with a linear motion member disposed at a center.

CITATION LIST

Patent Literature

Patent Literature 1: JP-A-2007-216280
Patent Literature 2: JP-A-H2-186157
Patent Literature 3: JP-A-2010-179323
Patent Literature 4: JP-A-2007-333046
Patent Literature 5: JP-A-2001-221229

FIG. 17 shows a cylinder linear motion actuator 7 driven by a motor 6. Such an actuator is being introduced as a replacement for air cylinders in production/transportation facilities for energy saving purposes. This cylinder type linear motion actuator makes use of a linear motion guide mechanism as a critical component, and by far this linear motion guide mechanism determines an outlook, cost and performance of the cylinder linear motion actuator.

Although the linear motion guide mechanism implemented by a linear rail guide offers high rigidity and superb linearity, it requires, as shown in FIG. 16 A, FIG. 16 B, a large number of fasteners 32 such as bolts in order to fix a straight rail 30, and this poses a hurdle in space saving and cost reduction.

The linear motion guide mechanisms which do not employ linear rail guides also have problems. Specifically, the disclosures in Patent Literatures 1 through 4 may be divided into two categories: first category (Patent Literatures 1, 2) with a primary object of preventing rotation of a linear movement member used in a mechanism for converting rotating movement into linear movement, and a second category (Patent Literatures 3, 4) with a primary object of making the mechanism capable of bearing an amount of load. However, even the latter ones are still limited in the direction of the load due to the number and locations of bearings. In particular, they are not applicable to loads exerted from oblique directions.

Patent Literature 5 discloses a technique for bearing a load from various directions. However, complicated procedures have to be followed to fix bearings and to adjust pressures at which the bearings are pressed onto a linear motion member.

When a linear motion guide device is utilized in solar orbital tracking components in solar photovoltaic/thermal power generation apparatuses, low maintenance features are essential. Furthermore, the device must be highly capable of preventing sand and water from entering actuator main bodies because the power generation apparatuses are usually installed in a huge number and in extreme environmental conditions such as in desert areas.

It is therefore an object of the present invention to provide a linear motion guide device which has high rigidity and high linear motion guiding accuracy with as little rattling as possible.

Another object of the present invention is to provide a linear motion guide device which requires as little maintenance as possible by preventing sand, water and others from entering an actuator main body.

Solution to Problem

A linear motion guide device according to the present invention includes: a housing; a threaded shaft supported by the housing rotatably about a center axis but axially immovably; and a linear motion member including a nut threaded around the threaded shaft, for movement axially of the threaded shaft by rotation of the threaded shaft. In this device, the housing includes a plurality of guide surfaces along the axial direction of the threaded shaft; the guide surfaces are provided by pairs of two surfaces; and the two guide surfaces in each pair are not parallel with each other but face away from each other. The linear motion member includes a plurality of segments arranged axially of the member and connected to each other; and each segment supports a plurality of guided members for contact with respective guide surfaces.

The segments are connected to each other so as to give a preload between the guide surfaces and the guided members.

By making the pressure inside the housing higher than the external pressure, it is possible to prevent external sand and water from entering the housing.

In order to reduce pressure difference between a compressing side and an expanding side caused by a reciprocating movement of the linear motion member, it is preferable that the housing has a vent filter.

A buffer member may be provided between the housing and the linear motion member.

Alternatively, a spring mechanism which maintains a constant pressure may be provided between the housing and the linear motion member.

Advantageous Effects of Invention

A linear motion guide device according to the present invention includes a linear motion member which is constituted by an axially divided plurality of segments, and each of these segments supports a plurality of guided members making contact with two paired guide surfaces. Since the arrangement makes it possible to give a preload between the guide surface and the guided member, the device provides increased rigidity and good linear motion guiding accuracy while reducing rattling.

Also, the linear motion guide device according to the present invention is highly capable of preventing sand and water from entering its actuator main body, and therefore does not require high maintenance. Hence, the device can be used appropriately as a linear motion member for a solar orbital tracking system in solar photovoltaic/thermal power generation apparatuses.

DETAILED DESCRIPTION OF THE INVENTION

An embodiment of the present invention will be described with reference to FIGS. 1A, 1B through FIG. 3.

Figure 1A:
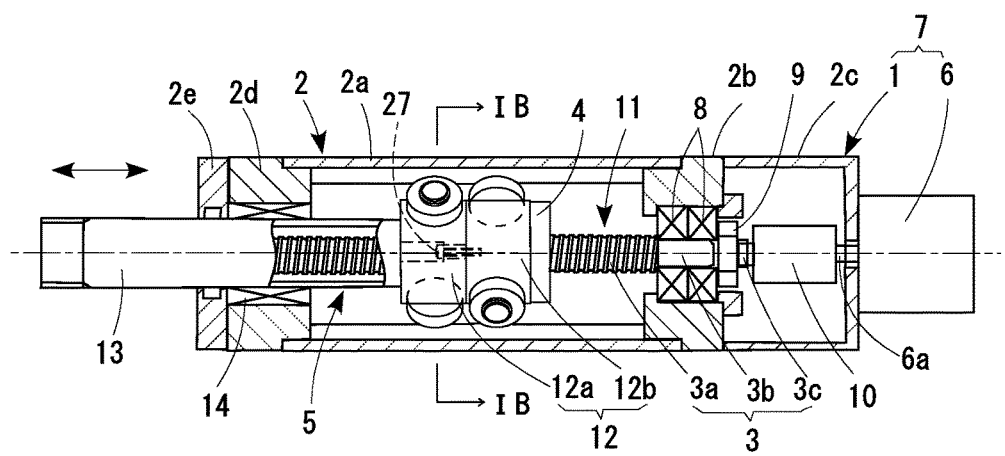
FIG. 1A is a partially broken side view of a linear motion actuator which includes a linear motion guide device according to an embodiment of the present invention.
Figure 1B:
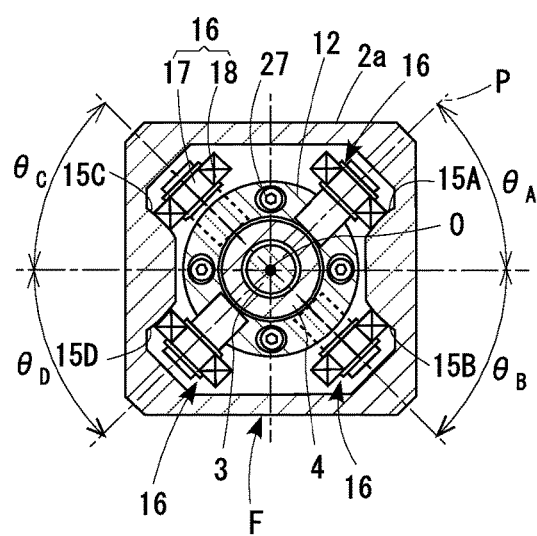
FIG. 1B is a sectional view taken in lines IB-IB in FIG. 1A.

Referring to FIG. 1A and FIG. 1B, a linear motion guide device 1 includes a linear motion member 5 which has a housing 2; a threaded shaft 3 supported by the housing 2 rotatably around the center axis but immovably along the axis; and a nut 4 threaded around the threaded shaft 3. The linear motion guide device 1 constitutes a linear motion actuator 7 together with a motor 6 which serves as a driving source.

The housing 2 has a cylindrical linear motion guide section 2a; a threaded-shaft support section 2b which is connected to one of two left-right ends of the linear motion guide section 2a; a coupling storage section 2c which is connected to an end of the threaded-shaft support section 2b; a shaft support section 2d which is connected to the other of the left-right ends of the linear motion guide section 2a; and a cap section 2e which is connected to an end of the shaft support section 2d.

The threaded shaft 3 has a ball screw section 3a for the nut 4 to thread around; a cylindrical surface section 3b which continues from the ball screw section 3a toward a base end; and a male-thread section 3c. The threaded shaft 3 is supported at the cylindrical surface section 3b rotatably by a multiple-row support bearing 8 which is fitted to an inner circumference of the threaded-shaft support section 2b of the housing 2. The support bearing 8 is provided by, e.g., a rolling bearing such as an angular contact ball bearing. The male-thread section 3c is threaded with a retaining nut 9, so the threaded shaft 3 is axially immovable. The threaded shaft 3 is connected to a rotation shaft 6a of the motor 6 which is disposed outside of the housing 2, via a coupling 10 placed inside the coupling storage section 2c.

The nut 4 is provided, e.g., by a ball nut which includes balls (not illustrated) that make circulating movement along a contact surface with the ball screw section 3a of the threaded shaft 3. The ball screw section 3a and the nut 4 constitute a ball screw mechanism 11. In the ball screw mechanism 11, the linear motion member 5 including the nut 4 makes axial movement as the threaded shaft 3 is rotated.

The linear motion member 5 includes the nut 4, a moving bracket 12 fitted around an outer circumference of the nut 4, and a shaft 13 extending axially of the threaded shaft 3 from the moving bracket 12. The nut 4 and the moving bracket 12 are connected to each other in a mutually non-rotatable fashion by means of splines for example, and are made axially immovable with respect to each other by unillustrated retaining means.

The moving bracket 12 is an assembly of an axially divided plurality of segments 12a, 12b. The embodiment shown in FIGS. 1A and 1B through FIG. 3 is an example in which the bracket is divided into two segments.

The segments 12a, 12b are connected and fixed to each other by set screws 27 so that their relative rotation angle around the threaded shaft 3 can be varied.

Figure 2:
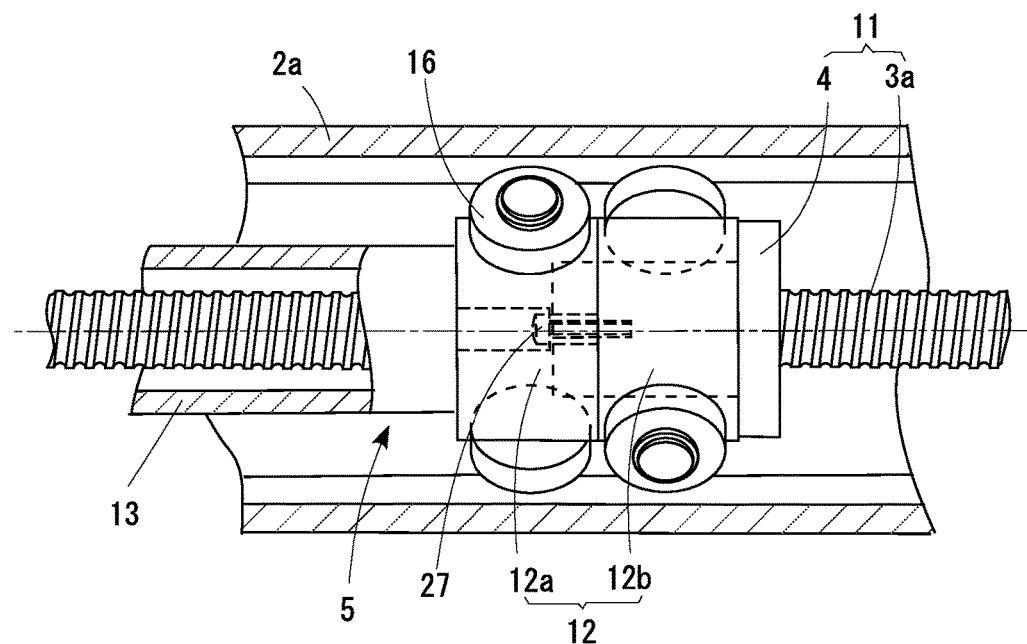
FIG. 2 is a partially enlarged view of FIG. 1A.
Figure 3:
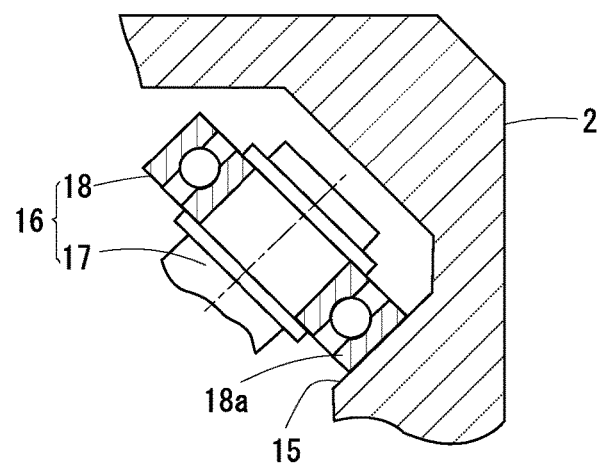
FIG. 3 is a partially enlarged view of FIG. 1B.

As shown in FIG. 2, the shaft 13 is cylindrical, and into its hollow space, a tip portion of the threaded shaft 3 extending out of the nut 4 is inserted. The shaft 13 is supported axially slidably along the threaded shaft 3 by a linear motion sliding bearing 14 which is fitted to an inner circumference of the shaft support section 2d of the housing 2. The moving bracket 12 and the shaft 13 maybe integral with each other or separate from each other.

As shown in FIG. 1B, the linear motion guide section 2a of the housing 2 has a substantially square section when cut perpendicularly to the axial direction of the threaded shaft 3, and is hollow, having an inner surface formed with a plurality of guide surfaces 15 (15A through 15D) of a consistent width axially of the threaded shaft 3. Each guide surface 15 is for guiding a guided member 16, which will be described later, axially of the threaded shaft 3. In the illustrated example, a total of four guide surfaces 15, i.e., a pair on the left side and another pair on the right side, are formed. These guide surfaces 15 are grouped in two pairs of an upper and a lower surfaces: Namely, the guide surface 15A and the guide surface 15B make a pair, whereas the guide surface 15C and the guide surface 15d make the other pair. In each pair, the guide surfaces 15 are not in parallel with each other and are facing away from each other. In other words, in each pair, the guide surfaces 15 would cross each other if they are extended. In each pair, the guide surfaces 15 are slanted with respect to a flat bottom surface F of the housing 2, by an angle of plus 45° and minus 45° respectively (θA, θB, θC and θD=45°).

Each of the segments 12a, 12b of the moving bracket 12 in the linear motion member 5 has a support portion supporting guided members 16 which make contact with the guide surfaces 15. Each guided member 16 is formed of a guide bearing which includes a trunnion shaft 17 extending radially with respect to the threaded shaft 3 from an outer surface of the respective segments 12a, 12b which constitute the moving bracket 12; and a rolling bearing 18 mounted to the trunnion shaft 17 so that the bearing's outer circumferential surface makes rolling contact with the guide surface 15. In each guided member 16, the trunnion shaft 17 has its center axis P crossing a center axis O of the threaded shaft 3. In this embodiment, the rolling bearing 18 is provided by a deep groove ball bearing.

The segments 12a, 12b are connected and fixed to each other with set screws 27 so that their relative rotation angle around the threaded shaft 3 can be varied. Therefore, it is possible to vary a contact pressure between the guided member 16 and the guide surface 15. This allows preload adjustment between the guided member 16 and the guide surface 15.

In the linear motion actuator 7 which makes use of the linear motion guide device 1, the motor 6 drives and rotates the threaded shaft 3, whereby the linear motion member 5 including the nut 4 is moved axially of the threaded shaft 3. In this movement, the plurality of guided members 16 on the moving bracket 12 of the linear motion member 5 maintain their contact with a corresponding one of the guide surfaces 15 formed in the housing 2, thereby accurately guiding the linear motion member 5 axially with respect to the threaded shaft 3.

Since these guide surfaces 15 are formed in pairs, and since two guide surfaces 15 in each of the two pairs are not in parallel with each other and are facing away from each other, a load exerted onto the linear motion member 5 is spread to all of the guide surfaces 15. Therefore, it is possible to receive loads from various directions and/or a big load. Also, the two guided members 16 which make contact with the respective pair of guide surfaces 15 (15A and 15B, or 15C and 15D) which face away from each other can be press-fitted onto their respective guide surfaces 15 by rotating the segments 12a, 12b relatively from each other around the threaded shaft 3 and then fixing to each other by using the set screws 27. Since this results in a structure in which the guided members 16 grasp a portion of the housing 2 which is sandwiched by the two guide surfaces 15, in a compressing manner, this improves rigidity of the housing 2. Since the guide surfaces 15 are arranged in such a manner that they are in pairs, and are on both sides of the threaded shaft 3 in terms of a diametrical direction, it is possible to support the load exerted onto the linear motion member 5 in a well balanced fashion with the pairs of guide surfaces 15. Since the guide surfaces 15 are formed on an inner surface of the housing 2 and it is not necessary to separately provide rails for guiding the guided members 16, it is possible to make the device compact.

In the present embodiment, the guided member 16 is provided by a guide bearing which includes a trunnion shaft 17 and a rolling bearing 18, and the rolling bearing 18 has its outer ring 18a making rolling contact with the guide surface 15. Therefore, friction resistance between the guide surface 15 and the guided member 16 is small, and it is possible to move the linear motion member 5 smoothly. Also, the rolling bearing 18 is provided by a deep groove ball bearing, which is easy to assemble, widely available and is low cost.

Figure 4:
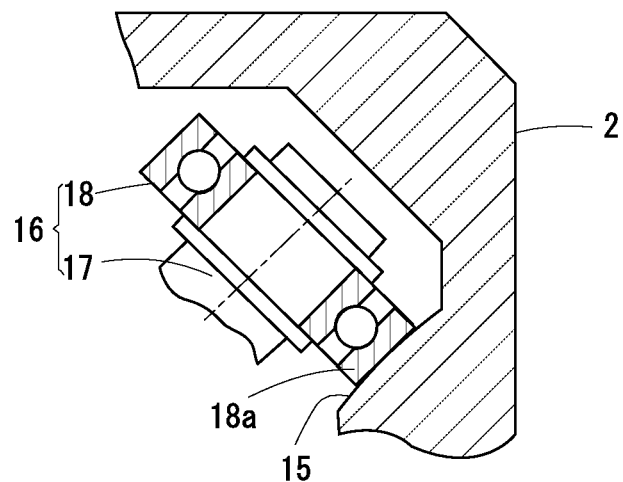
FIG. 4 is a sectional view showing a different example of a guide surface of the linear motion guide device.

As exemplified in FIG. 4, the guide surface 15 may be a curved surface which has an arc-like convex section in a sectional view which is taken vertically to the center axis O of the threaded shaft 3. In this case, the arrangement prevents the rolling bearing 18 from making contact on an edge of an outer circumferential surface of the outer ring 18a with respect to the guide surface 15.

Figure 5:
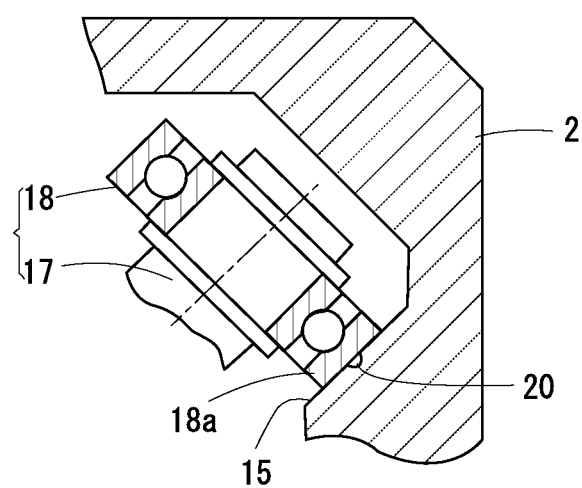
FIG. 5 is a sectional view showing still another different example of the guide surface.

Also, as shown in FIG. 5, an axially extending oil storage groove 20 may be formed within a width of the guide surface 15 which makes contact with the rolling bearing 18. In this case, the arrangement prevents lack of lubrication oil on the outer circumferential surface of the outer ring 18a in the rolling bearing 18, leading to improved durability of the rolling bearing 18.

Figure 6:
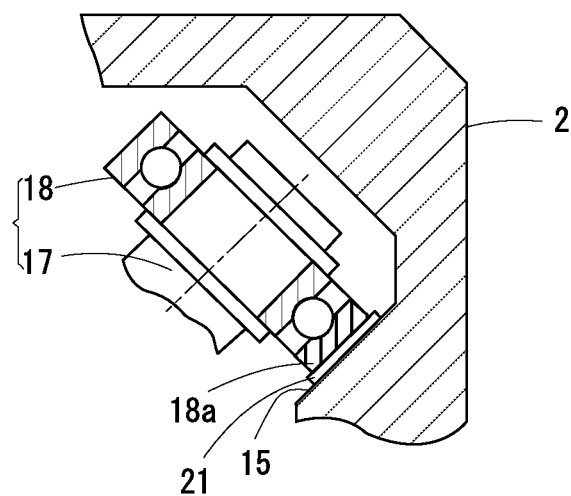
FIG. 6 is a sectional view showing still another different example of the guide surface.

As shown in FIG. 6, a platy member 21 which has a higher surface hardness than the guide surface 15 may be placed between the guide surface 15 and the rolling bearing 18 for wear resistance. The platy member 21 may be adhesively provided on a surface of the guide surface 15 for example. In this case, the arrangement improves durability of the guide surface 15 against wear from rolling contact by the rolling bearing 18.

Instead of using the platy member 21, a surface hardening treatment may be provided to the guide surface 15. This also improves durability of the guide surface 15. Alternatively, the entire housing 2 may be heat treated for increased hardness. This also improves durability of the guide surface 15.

Figure 7:
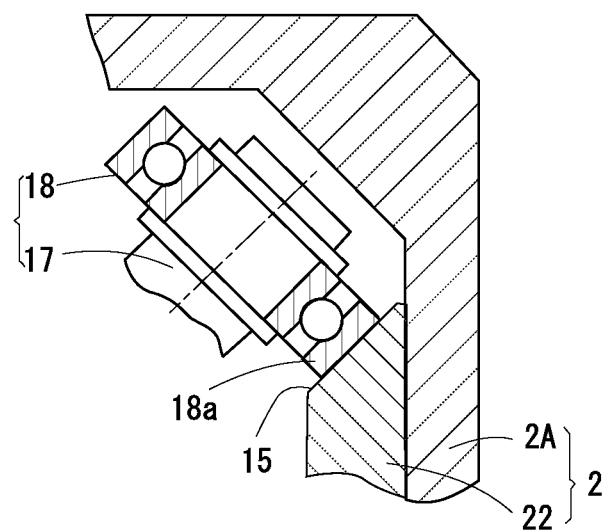
FIG. 7 is a sectional view showing still another different example of the guide surface.

As shown in FIG. 7, the housing 2 may be constituted by a housing main body 2A and a guide surface formation member 22 which has a guide surface 15 and is fixed to the housing main body 2A. The housing main body 2A and the guide surface formation member 22 are fixed with bolts or other appropriate methods. In this case, the arrangement makes it easy to form the guide surface 15.

Figure 8:
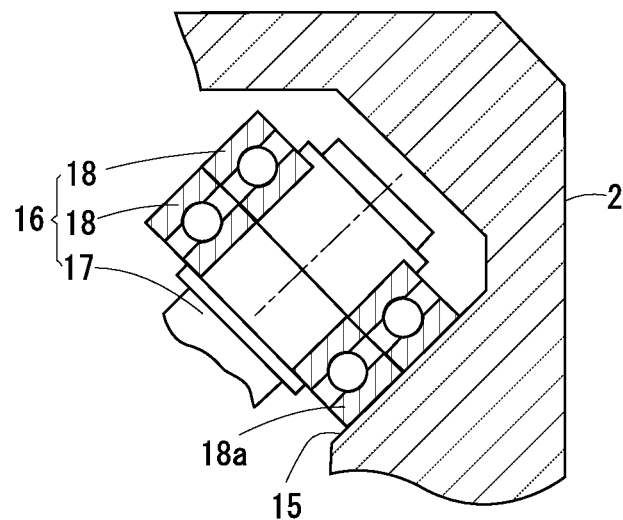
FIG. 8 is a sectional view showing a different example of a guided member of the linear motion guide device.

As shown in FIG. 8, the rolling bearing 18 may be provided by a plurality of angular contact ball bearings which are assembled back-to-back or face-to-face, axially around the trunnion shaft 17. These angular contact ball bearings should desirably be preloaded. The rolling bearings 18 provided by multiple angular contact ball bearings make the device capable of receiving not only a load vertical to the guide surface 15 but also a load from a width direction of the guide surface 15. Also, a preload eliminates a gap between the bearings, and increases rigidity.

Figure 9:
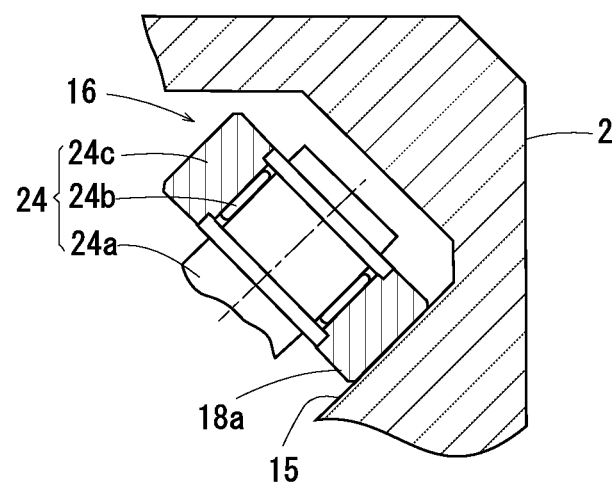
FIG. 9 is a sectional view showing still another different example of the guided member.

As shown in FIG. 9, instead of a combination of the trunnion shaft 17 and the rolling bearing 18, the guide bearing constituting the guided member 16 may be formed of a cam follower 24 which includes a shaft 24a and a roller 24c attached around an outer circumference of the shaft via rolling elements 24b and functioning also as an outer ring. In the cam follower 24, its outer ring, i.e., the roller 24c, makes wider contact than in the rolling bearings 18 provided by a deep groove ball bearing or an angular contact ball bearing, so it is possible to increase a load capacity in a single component. If the rolling elements 24b are provided by rollers such as cylindrical rollers, it is possible to increase the load capability further. Also, since the cam follower 24 does not have an inner ring, it can be disposed in a diametrically tight space.

In cases where the guide bearing is provided by the rolling bearing 18 or the cam follower 24 which makes rolling contact with the guide surface 15, a resin coating with polyurethane for example, may be provided on an outer circumferential surface of the outer ring 18a or 24c of the guide bearing. This can improve slidability between the outer ring 18a or 24c and the guide surface 15.

Figure 10:
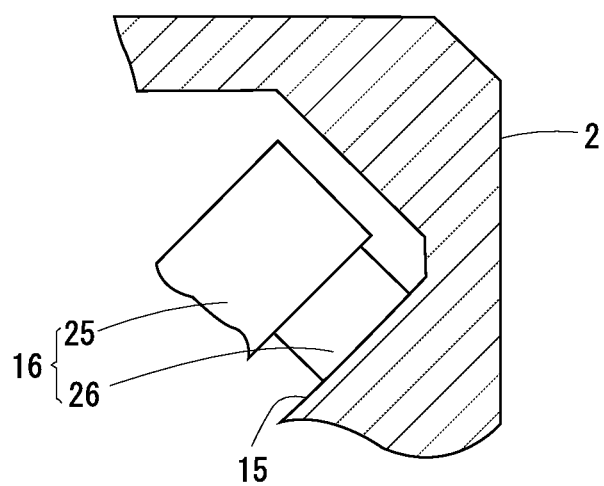
FIG. 10 is a sectional view showing still another different example of the guided member.

As shown in FIG. 10, the guided member 16 may make sliding contact with the guide surface 15. This guided member 16 includes a support member 25 extending radially outward from the moving bracket 12, and a sliding contact member 26 fixed thereon for making sliding contact with the guide surface 15. The guided member 16 which makes sliding contact with the guide surface 15 also can guide the linear motion member 5 accurately along the axial direction of the threaded shaft 3.

Figure 11:
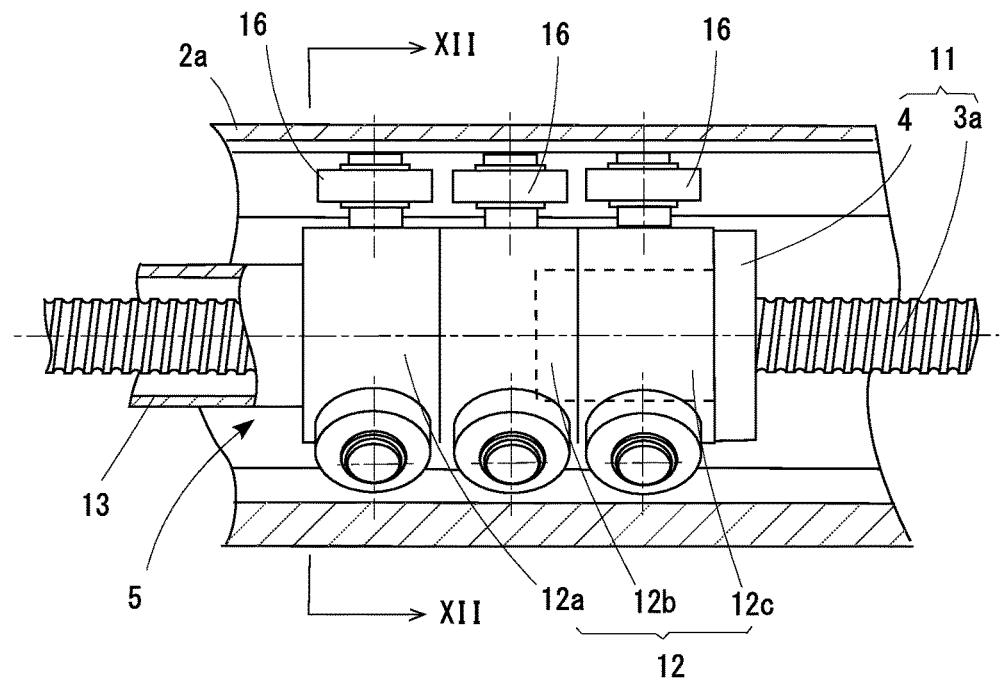
FIG. 11 is a partially unillustrated, partially broken side view of a linear motion guide device according to a different embodiment of the present invention.

FIG. 11 shows an arrangement where the moving bracket 12 of the linear motion member 5 is formed of three axially arranged segments 12a, 12b, 12c, and each of the three segments 12a, 12b, 12c has three guided members 16 at an interval of 120° in a rotating direction of the threaded shaft 3.

Figure 12:
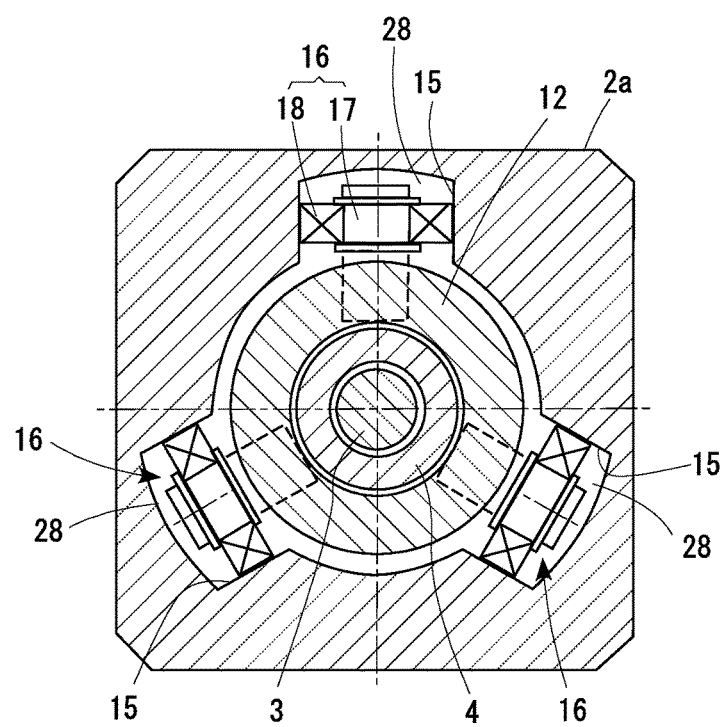
FIG. 12 is a sectional view of the embodiment shown in FIG. 11.

In the embodiment shown in FIG. 11, three axially extending linear track grooves 28 are formed as shown in FIG. 12, in an inner surface of the housing 2, and mutually opposing walls in each track groove 28 provide guide surfaces 15 for the guided member 16.

Figure 13:
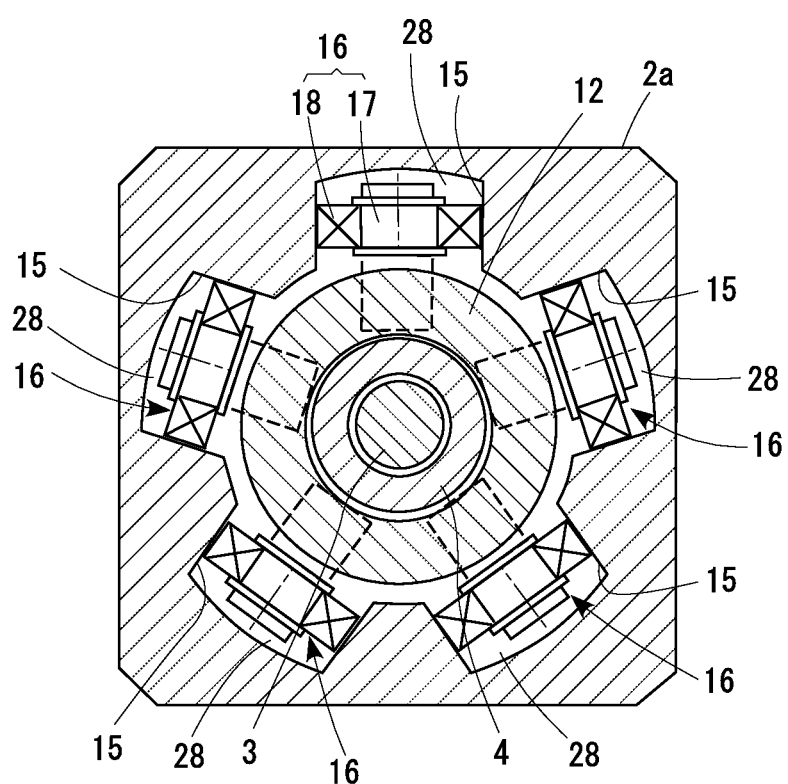
FIG. 13 is a sectional view of an embodiment including a housing having an inner surface formed with five track grooves.

FIG. 13 shows an example in which five axially extending linear track grooves 28 are formed in an inner surface of the housing 2, and mutually opposing walls in each track groove 28 provide guide surfaces 15 for the guided member 16.

When the linear motion guide device 1 is utilized in solar orbital tracking components in solar photovoltaic/thermal power generation apparatuses, low maintenance features are essential and the device must be highly capable of preventing sand and water from entering actuator main bodies because the generation apparatuses are usually installed in a huge number under extreme environmental conditions such as in desert areas.

Figure 14:
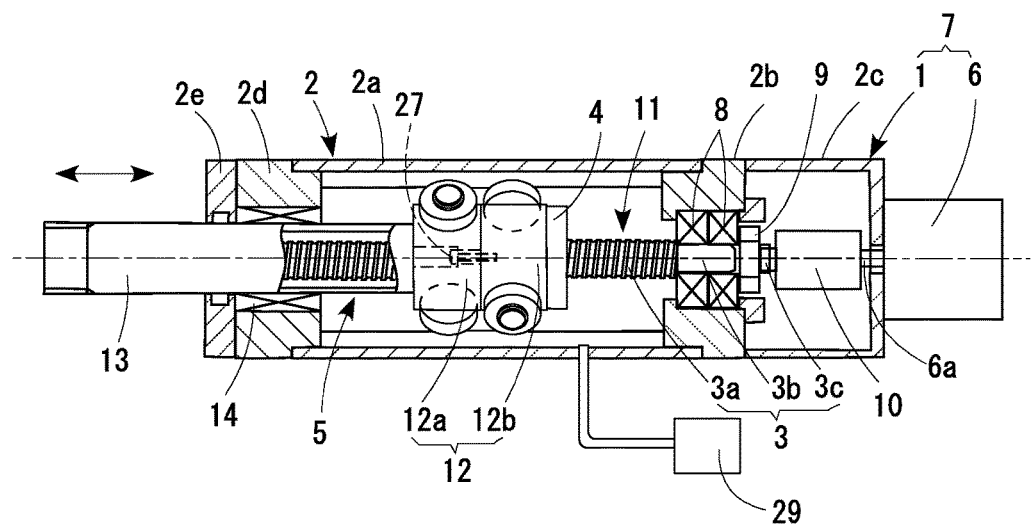
FIG. 14 is a partially broken side view of a linear motion actuator which includes a linear motion guide device according to another embodiment of the present invention.

For this reason, it is preferable that the housing 2 has a sealed structure, and the housing 2 has its internal pressure kept higher than external pressure. By making the pressure inside the housing 2 higher than the external pressure, it becomes possible to prevent external sand and water from entering the housing 2. The pressure inside the housing 2 can be made higher than the external pressure by, for example, connecting a pressurizing pump 29 to the housing 2 as shown in FIG. 14.

Figure 15:
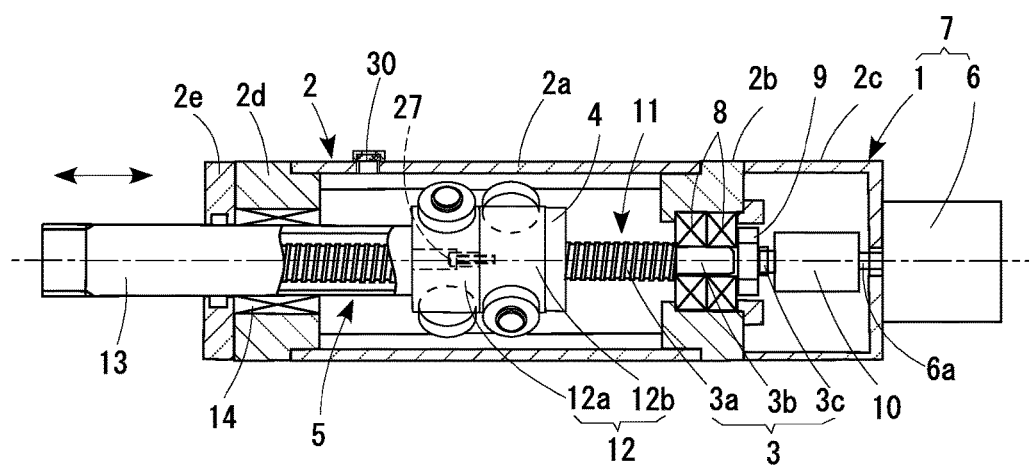
FIG. 15 is a partially broken side view of a linear motion actuator which includes a linear motion guide device according to another embodiment of the present invention.
Figure 16A:
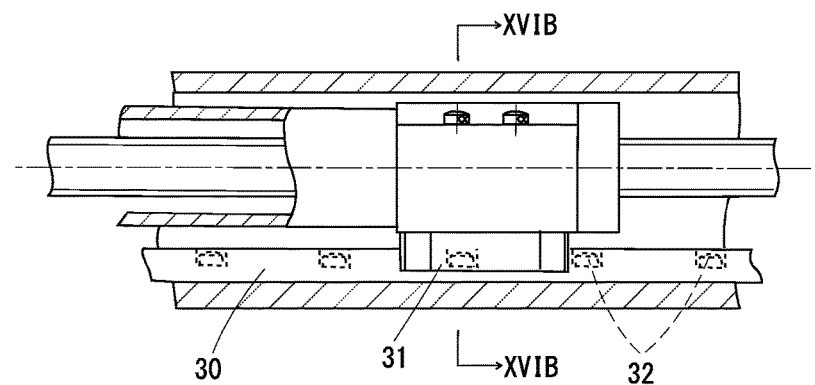
FIG. 16A is a partially broken side view of a conventional linear motion guide device.
Figure 16B:
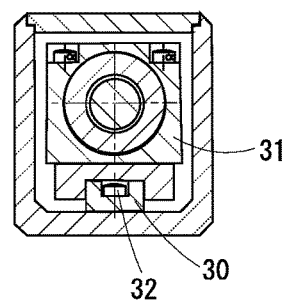
FIG. 16B is a sectional view taken in lines XVIB-XVIB in FIG. 16A.
Figure 17:
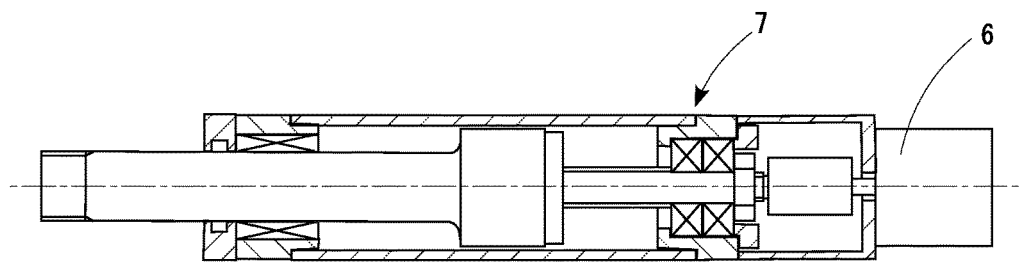
FIG. 17 is a partially broken side view of a conventional linear motion actuator.

If sealed structure is used for the housing 2, the reciprocating linear motion member 5 creates pressure difference within the housing 2, with air compressed on one side while expanded on the other side. In order to reduce the pressure difference, it is preferable to use a vent filter 30 in the housing 2 as shown in FIG. 15.

Also, a buffer member may be provided between the housing 2 and the linear motion member 5.

Alternatively, a spring mechanism which maintains a constant pressure may be provided between the housing 2 and the linear motion member 5.

REFERENCE SIGNS LIST

1 Linear Motion Guide Device
2 Housing
2A Housing Main Body
3 Threaded Shaft
4 Nut
5 Linear Motion Member
6 Motor
7 Linear Motion Actuator
12 Moving Bracket
12a, 12b, 12c Segments
15, 15A, 15B, 15C, 15D Guide Surface
16 Guided Member
17 Trunnion Shaft
18 Rolling Bearing
18a Outer Ring
20 Oil Storage Groove
21 Platy Member
22 Guide Surface Formation Member
24 Cam Follower
24c Roller (Outer Ring)
26 Sliding Contact Member
27 Set Screw
28 Track Groove
29 Pressurizing Pump
30 Vent Filter

The invention claimed is:

1. A linear motion guide device comprising: a housing; a threaded shaft supported by the housing rotatably about a center axis but axially immovably; and a linear motion member including a nut threaded around the threaded shaft, for movement axially of the threaded shaft by rotation of the threaded shaft;

the housing including a plurality of guide surfaces along the axial direction of the threaded shaft; the guide surfaces being provided by pairs of two surfaces; the two guide surfaces in each pair being not parallel with each other but facing away from each other; the linear motion member including a plurality of segments arranged axially of the member and connected to each other; each segment supporting a plurality of guided members for contact with respective guide surfaces, wherein the plurality of segments are connected to each other so as to give a preload between the guide surfaces and the guided members.

2. The linear motion guide device according to claim 1, wherein each of the segments includes trunnion shafts each extending radially with respect to the threaded shaft, and each of the guided members is a guide roller supported by a respective one of the trunnion shafts.

3. The linear motion guide device according to claim 1, wherein the guided member is a slidable sliding member.

4. The linear motion guide device according to claim 1, wherein the housing is configured to maintain an internal pressure higher than an external pressure.

5. The linear motion guide device according to claim 1, wherein the housing includes a vent filter for reducing a pressure difference between an air-compression side and an air-expansion side caused by a reciprocating movement of the linear motion member within the housing.

6. The linear motion guide device according to claim 1, further comprising a buffer member between the housing and the linear motion member.

7. The linear motion guide device according to claim 1, further comprising a spring mechanism placed between the housing and the linear motion member, the spring mechanism being configured to maintain a consistent air pressure.

* * * * *